United States Patent Office 3,474,170
Patented Oct. 21, 1969

3,474,170
PESTICIDAL CARBAMATES OF DIHYDRO-BENZOFURANOLS
William G. Scharpf, Rocktown, N.J., assignor to FMC Corporation, New York, N.Y., a corporation of Delaware
No Drawing. Continuation-in-part of application Ser. No. 339,612, Jan. 23, 1964. This application Oct 12, 1964, Ser. No. 403,324
Int. Cl. A61n 9/28; C07d 5/40
U.S. Cl. 424—285    18 Claims This application is a continuation-in-part of copending application Serial No. 339,612, filed January 23, 1964.

This invention relates to new chemical compounds and their preparation, to pesticidal compositions containing these new compounds, and to their use to control Arthropoda and Nematoda. More particularly, this invention relates to certain dihydro-4-benzofuranyl and dihydro-7-benzofuranyl esters of carbamic acids, as novel and effective pesticides.

The compounds of this invention, and their numbering system, are represented by the general formulae:

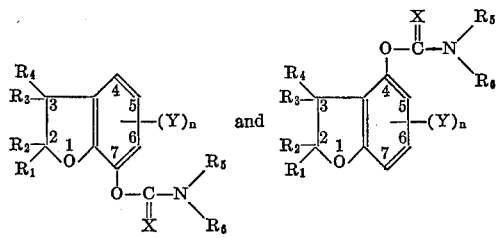

where $R_1$, $R_2$, $R_3$, and $R_4$ are each hydrogen or aliphatic groups of one to about three carbon atoms including alkyl and alkenyl groups; $R_5$ and $R_6$ are each hydrogen or aliphatic groups of one to about three carbon atoms, including alkyl, alkenyl, and alkynyl groups; and X is oxygen or sulfur. These compounds may be unsubstituted in the benzene ring, or may contain one or more substituents Y in the benzene ring as shown, where $n$ is an integer of 1 to 3, which substituents Y may be the same or different and may be lower aliphatic groups, including alkyl and alkenyl groups, halogen, haloalkyl, nitro, amino and substituted amino, cyano, alkoxycarbonyl, acyl, alkylmercapto, alkoxy, other carbamate groups, and the like.

Compounds of the above-defined class exhibit outstanding pesticidal activity, including effective activity against Nematoda and against Arthropoda such as Coleoptera (beetles), Hemiptera (true bugs), Homoptera( aphids), Acarina (mites), Diptera (flies and wasps), Blattaria (roaches), and Lepidoptera (moths and butterflies).

Certain preferred compounds of this invention include compounds of the general formulae:

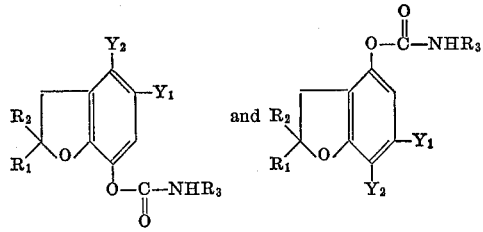

wherein $R_1$ and $R_2$ are each hydrogen or methyl, $R_3$ is hydrogen or an aliphatic group of one to three carbon atoms, and $Y_1$ and $Y_2$ are each hydrogen, halogen, or lower alkyl.

The preparation and pesticidal activity of typical compounds of this invention are illustrated in the following specific examples, which are provided only by way of illustration and not of limitation. All parts are by weight where not otherwise indicated, and all temperatures are in degrees centigrade.

Example 1.—Preparation and pesticidal properties of 2,3-dihydro - 2,2 - dimethyl - 7 - benzofuranyl N - methylcarbamate This compound was prepared by a novel procedure whereby 2-methallyloxyphenol was simultaneously cyclized and rearranged to form a 7-benzofuranol, followed by esterification to form the carbamate. The starting material 2-methallyloxyphenol was prepared as follows: To a stirred mixture of 322 parts of catechol in 300 parts of dry acetone was slowly added, under nitrogen atmosphere, 401 parts of potassium carbonate and 481 parts of potassium iodide. The mass was heated to reflux temperature, and 262 parts of methallyl chloride was added slowly. The mixture was refluxed for 30 hours, allowed to cool and stand for 18 hours, filtered, and the filtrate concentrated under reduced pressure. The residual oil was extracted with chloroform, and the chloroform solution washed with water, dried and concentrated. The residual oil was distilled to give 213 parts of 2-methallyloxyphenol B.P. 78.5–83.0°/0.55 mm., $n_D^{25}$ 1.5300.

2,3-dihydro-2,2-dimethyl-7-benzofuranol was prepared as follows: A round-bottom flask containing 131 parts of 2-methallyloxyphenol was heated slowly with stirring. At 200° an exothermic reaction occurred, and the temperature of the mixture in the flask increased rapidly to 275°. The temperature was controlled at 275° by external cooling. The thick sirup was distilled under reduced pressure to yield colorless liquid 2,3-dihydro-2,2-dimethyl-7-benzofuranol, B.P. 78–80° (0.35–0.40 mm.), $n_D^{25}$ 1.5401.

2,3 - dihydro - 2,2 - dimethyl - 7 - benzofuranyl N-methylcarbamate was prepared as follows: a cold solution of 16.4 parts 2,3-dihydro-2,2-dimethyl-7-benzofuranol in 14 parts of ether was treated with 5.8 parts methyl isocyanate and 0.1 part triethylamine. The mixture was stirred at room temperature, and a white crystalline product precipitated. Separation of the solid yielded 17.5 parts of 2,3-dihydro-2,2-dimethyl-7-benzofuranyl N-methylcarbamate, M.P. 151–152°. Recrystallization from methylcyclohexane gave an analytical sample.

Analysis.—Calc'd for $C_{12}H_{15}NO_2$: N, 6.33. Found: N, 6.57.

Insecticidal activity was measured as follows: The compound 2,3-dihydro-2,2-dimethyl-7-benzofuranyl N-methylcarbamate was dissolved to form a 1% solution in acetone, which was then diluted with water to provide a concentration of 1250 p.p.m. of active ingredient. Test insects and techniques were as follows: The activities against Mexican bean beetles (*Epilachna varivestis* Mulsant) and southern armyworms (*Prodenia eridania* Cramer) were evaluated by dipping the leaves of pinto bean plants into the test solution, and infesting the leaves with the test insects; the activity against the two-spotted spider mite (*Tetranychus telarius* Linnaeus) was evaluated on pinto bean plants whose leaves were dipped after infestation; the activity against the pea aphid (*Macrosiphum pisi* Harris) was evaluated on broad bean plants whose leaves were dipped before infestation; and the activity against the milkweed bug (*Oncopeltus fasciatus* Dallas) was evaluated by spraying the test solution into glass dishes containing the insects. After seventy-two hours of exposure of the test insects as described above, the percent kill was determined. Results presented below and in the succeeding examples are each an average of two or more replicates.

The procedure followed for evaluation of activity against houseflies was as follows: One microliter of a solution of 2000 mg. of the test compound in 100 ml. of acetone was applied to the body of each of 35 to 45 three- to four-day-old houseflies (*Musca domestica*). Activity against cockroaches was similarly evaluated using 20 adult male German roaches (*Blatella germanica*). After 24 hours, the percent kill was determined by physical counting of the dead and living insects.

Nematode control was measured as follows: A nematode-infested soil was prepared by mixing about 1000 larvae of the root-knot nematode (*Meloidogyne incognita* var. *acrita*) into a liter of sandy-loam soil. Into this infested soil was blended sufficient test compound, formulated as a 5% dust on attapulgite clay, to give a concentration of 25 p.p.m. This mixture was held in the greenhouse in a moist condition for 4–7 days, then young tomato plants were planted in the soil and allowed to grow for 4–6 weeks. When appropriate growth was attained, the roots of the tomato plants were washed free of said and the degree of infestation was evaluated in comparison with a plant grown in nematode-infested soil which had received no chemical treatment. Results, as reported in the table below and in subsequent examples, represent the average of two replicates.

Table 1.—Pesticidal activity of 2,3-dihydro-2,2-dimethyl-7-benzofuranyl N-methylcarbamate

| Test pest: | Percent kill |
| --- | --- |
| Mexican bean bettle | 100 |
| Pea aphid | 100 |
| Southern armyworm | 100 |
| Two-spotted mite | 51 |
| Milkweed bug | 100 |
| Housefly | 100 |
| German cockroach | 100 |
| Root-knot nematode | (1) |

[1] Complete control, no knots.

Example 2.—Preparation and pesticidal properties of 2,3-dihydro - 2,2 - dimethyl - 4 - benzofuranyl N - methylcarbamate This compound was prepared by the following series of reactions: to a solution of 168 g. of methyl beta-resorcylate in 250 ml. of methanol was added 54 g. of sodium methoxide over a 20 minute period. The reaction mass was cooled and 100 g. of 3-chloro-2-methylpropene was added. The mixture was refluxed for 2.5 hours and allowed to stand for 16 hours. The slurry was filtered to remove the precipitated sodium chloride, and the filtrate was concentrated and distilled to give a fraction boiling at 120–30° (0.3 mm.). The distillate was cooled to 0° and filtered to separate the 64.2 g. of solid starting material from the 75.2 g. of oil. This oil was poured slowly into a cold stirred solution of 20 g. of sodium hydroxide in 500 ml. of water. The slurry was stirred an additional 30 minutes, filtered, and the solid washed with 30 ml. of water and then with 50 ml. of ether to give 74 g. of sodium salt. This was added to a mixture of 50 ml. of concentrated hydrochloric acid, 250 g. of ice, and 100 ml. of ether. The aqueous layer was extracted twice with 100-ml. portions of ether, and the combined ether layers were dried over magnesium sulfate and concentrated to yield 47.0 g. of crude methyl 4-[(2-methylallyl)oxy]salicylate, melting at 35–6°. An analytical sample was recrystallized three times from pentane to melt at 36–7°. Since the infrared spectrum showed the presence of hydrogen bonding, the free hydroxyl group was shown to be ortho to the ester grouping.

*Analysis.*—Calc'd for $C_{12}H_{14}O_4$: C, 64.85; H, 6.35. Found: C, 64.80; H, 6.53.

Forty-six grams of the above ester was slowly heated in a nitrogen atmosphere. At 240° an exothermic reaction took place and the temperature rose to 290°. The oil was maintained at 250° for an additional 20 minutes and allowed to cool. The semi-solid was crystallized from a mixture of methanol and water, and from hexane to give 9.5 g. of crude methyl 4-hydroxy-2,3-dihydro-2,2-dimethyl - 5-benzofurancarboxylate, melting at 89–93°. Saponification was accomplished by refluxing a mixture of 9.2 g. of this ester with 50 ml. of 10% sodium hydroxide solution for two hours. After cooling and acidifying the mixture with 15 ml. of concentrated hydrochloric acid, the crude 4-hydroxy-2,3-dihydro-2,2-dimethyl-5-benzofurancarboxylic acid was extracted with ether. The ether solution was dried over magnesium sulfate and concentrated to yield 9.0 g. of product. This acid (8.6 g.) was decarboxylated by heating at 210–20° for 0.5 hour. After cooling, the liquid was distilled to yield 2.8 g. of 2,3-dihydro-2,2 - dimethyl - 4 - benzofuranol boiling at 108–11° (0.5 mm.). This oil solidified to melt at 89–91°. The structure of this compound was confirmed by infrared analysis.

*Analysis.*—Calc'd for $C_{10}H_{12}O_2$: C, 73.14; H, 7.31. Found: C, 72.94; H, 7.56.

This phenol was esterified according to the procedure described in Example 1. Reaction of 1.9 g. of 2,3-dihydro-2,2-dimethyl-4-benzofuranol with 0.8 g. of methyl isocyanate gave 1.9 g. of 2,3-dihydro-2,2-dimethyl-4-benzofuranyl N-methylcarbamate, melting at 117–8° after recrystallization from carbon tetrachloride and from methylcyclohexane. Infrared analysis confirmed the structure of this product.

*Analysis.*—Calc'd for $C_{12}H_{15}NO_3$: N, 6.33. Found: N, 6.32.

Following the test procedures described for the compound of Example 1, 2,3-dihydro-2,2-dimethyl-4-benzofuranyl N-methylcarbamate exhibited at 1250 p.p.m. 100% kill of the Mexican bean beetle, 100% kill of the two-spotted mite, 100% kill of the milkweed bug, 95% kill of the pea aphid, and 100% kill of houseflies.

Example 3.—Preparation and insecticidal properties of 2,3-dihydro-7-benzofuranyl N-methylcarbamate The intermediate 7-benzofuranol was prepared from 2-hydroxy-m-anisaldehyde by the following series of reactions: To a refluxing solution of 26.5 g. of 2-hydroxy-m-anisaldehyde and 28.7 g. of ethyl bromoacetate in 100 ml. of absolute ethanol was added dropwise a solution prepared by dissolving 7.5 g. of sodium in 200 ml. of absolute ethanol. The mixture was refluxed an additional 3.5 hours and stirred overnight. A solution of 7.5 g. of potassium hydroxide in 100 ml. of water was added and the ethanol was removed by distillation. The residue was cooled, acidified with 6 N hydrochloric acid and allowed to stand overnight. The precipitate was isolated by filtration, and dissolved in sodium bicarbonate solution. This solution was washed with ether and acidified to yield 18.3 g. of crude 7-methoxy-2-benzofurancarboxylic acid, melting at 209–11°. A mixture of 10 g. of this acid and 185 ml. of chlorobenzene was stirred and warmed on a steam bath as 26 g. of anhydrous aluminum chloride was added portionwise. After 0.5 hour heating, the solution was poured onto ice and dilute hydrochloric acid. The chlorobenzene was removed by steam distillation and the product was extracted with ethyl acetate. The organic solution was dried over magnesium sulfate and concentrated to dryness under vacuum to yield 7.5 g. of 7-hydroxy-2-benzofurancarboxylic acid melting at 192–7°. The crude solid was recrystallized from water to melt at 218–20°. A mixture of 11.3 g. of this recrystallized product, 76 g. of refined quinoline and 1.5 g. of copper powder was heated at 120–5° until evolution of carbon dioxide ceased. The cooled mixture was diluted with 250 ml. of ether and filtered. The filtrate was washed with three 150-ml. portions of 3 N hydrochloric acid and with a 200-ml. portion of water. It was dried over magnesium sulfate and distilled. After removal of the ether and quinoline, a yield of 3 g. of 7-benzofuranol, boiling at 72–8° (0.2 mm.), was obtained.

This phenol was esterified by the following procedure: To a mixture of 3.1 g. of 7-benzofuranol and 1.7 g. of methyl isocyanate was added 4 drops of triethylamine. An immediate exothermic reaction took place. The mixture was heated at 45–50° for 24 hours and poured into water. The water was extracted with ether, the ether solution dried and concentrated to dryness under vacuum to yield 3.4 g. of crude 7-benzofuranyl N-methylcarbamate melting at 137–8°. This compound was recrystallized from benzene.

Analysis.—Calc'd for $C_{10}H_9NO_3$: C, 62.82; H, 4.71; N, 7.33. Found: C, 62.62; H, 4.89; N, 7.58.

A mixture of 6 g. of 7-benzofuranyl N-methylcarbamate in 350 ml. of anhydrous ethanol and 1.5 g. of 10% palladium on charcoal was shaken in a hydrogen atmosphere of 49 pounds. When the theoretical amount of hydrogen had been absorbed, the catalyst was removed by filtration and the filtrate was dried over magnesium sulfate. The ethanol was removed and the residual solid was recrystallized from methylcyclohexane to yield 4 g. of pure 2,3-dihydro-7-benzofuranyl N-methylcarbamate melting at 145–7°.

Following the test procedure described for the compound of Example 1, 2,3-dihydro-7-benzofuranyl N-methylcarbamate exhibited 100% kill of the Mexican bean beetle, 100% kill of the milkweed bug, and 100% kill of houseflies.

Example 4.—Preparation and pesticidal properties of 2,3-dihydro-2-methyl-7-benzofuranyl N-methylcarbamate The intermediate 2,3-dihydro-2-methyl-7-benzofuranol was prepared from catechol by the following series of reactions: By the method of Perkin and Trikojus (J. Chem. Soc., 1927, 1664), 4 moles of catechol, 4 moles of potassium carbonate, and 4 moles of 3-bromopropene in 500 ml. of acetone were reacted and the product distilled to yield 219 g. of 2-(allyloxy)-phenol, B.P. 75–80° (0.7–1.4 mm.), $n_D^{25}$ 1.5391. This compound was rearranged at 200–75° and distilled through a 30 cm. Vigreaux column to yield 171 g. of a mixture of 3- and 4-allylcatechol (B.P. 83–90° at 0.25 mm.) and 16.5 g. of 4-allylcatechol boiling at 90–3° (0.25 mm.), M.P. 39–42°. This last fraction was recrystallized from methylcyclohexane to melt at 46.0–7.5° (lit. M.P. 48°). The mixed isomer fraction was redistilled to yield 72.1 g. of 3-allylcatechol boiling at 105–10° (1.6 mm.), $n_D^{25}$ 1.5613.

The 3-allylcatechol was cyclized as follows: a mixture of 35 g. of 3-allylcatechol, 35 g. of dimethylaniline hydrochloride, and 0.1 g. of hydroquinone was heated for 6.75 hours at 175–85°, cooled, and diluted with 7 ml. of ether. The slurry was washed with four 35-ml. portions of water, the organic phase was dried over magnesium sulfate, filtered and distilled to yield 13.6 g. of 2,3-dihydro-2-methyl-7-benzofuranol boiling at 76–7° (0.7 mm.), $n_D^{25}$ 1.5535. The structure of this compound was confirmed by nuclear magnetic resonance studies.

The carbamate ester was formed by reaction of the intermediate phenol with methyl isocyanate as follows: 2,3-dihydro-2-methyl-7-benzofuranol (13.6 g.) was reacted with 5.7 g. of methyl isocyanate and the solid product was recrystallized from methylcyclohexane to yield 8.5 g. of 2,3-dihydro-2-methyl-7-benzofuranyl N-methylcarbamate melting at 118.5–20.0°. A second recrystallization from carbon tetrachloride raised the melting point to 121–2°. The structure was confirmed by nuclear magnetic resonance studies.

Analysis.—Calc'd for $C_{11}H_{13}NO_3$: N, 6.76. Found: N, 6.84.

Following the test procedure described for the compound of Example 1, 2,3-dihydro-2-methyl-7-benzofuranyl N-methylcarbamate exhibited, at a dilution of 1250 p.p.m., 100% kill of the Mexican bean beetle, the pea aphid, the southern armyworm and the milkweed bug, 97% kill of the two-spotted mite, and 100% kill of houseflies.

Example 5.—Preparation and pesticidal properties of 2,3-dihydro-2,2-dimethyl-7-benzofuranyl carbamate The intermediate 2,3-dihydro-2,2-dimethyl-7-benzofuranyl chloroformate was prepared as follows: A stirred solution of 215 g. of 2,3-dihydro-2,2-dimethyl-7-benzofuranol and 100 ml. of phosgene was maintained at 4–7° as 131 g. of triethylamine was added dropwise. The solution was stirred an additional hour at 5°, then diluted with 400 ml. of cold water. The benzene solution was washed with 20% hydrochloric acid solution, and with water until the aqueous extracts were neutral. The organic layer was dried over magnesium sulfate and concentrated under vacuum to yield 293 g. of crude 2,3-dihydro-2,2-dimethyl-7-benzofuranyl chloroformate, melting at 88–91° C.

A solution of 10.8 g. of 2,3-dihydro-2,2-dimethyl-7-benzofuranyl chloroformate in 75 ml. of ether was slowly added to a stirred mixture of 2.8 ml. of 30% ammonium hydroxide solution and 25 ml. of ice water, maintaining the temperature at 5°. The mixture was stirred one hour at 5° after the addition was complete. The solid which had precipitated was separated by filtration at 5°, washed with water and dried to yield 5.8 g. of crude 2,3-dihydro-2,2-dimethyl-7-benzofuranyl crabamate, melting at 153–7°. By recrystallization from benzene 3.5 g. of pure product, melting at 173.5–4.5° was obtained.

Analysis.—Calc'd for $C_{11}H_{13}NO_3$: N, 6.76. Found: N, 6.94.

Following the procedures described in Example 1, the compound 2,3-dihydro-2,2-dimethyl-7-benzofuranyl carbamate exhibited 100% kill of the Mexican bean beetle and 100% kill of the pea aphid.

Example 6.—Preparation and pesticidal properties of 2,3 - dihydro - 2,2 - dimethyl - 7 - benzofuranyl N,N-dimethylcarbamate To a cold, stirred solution of 50.0 g. of 2,3-dihydro-2,2-dimethyl-7-benzofuranol in 100 ml. of ether was slowly added a solution prepared by dissolving 6.9 g. of sodium in 120 ml. of ethanol. The dark solution was stirred for an additional 1.5 hours and was concentrated in vacuum to give 58.8 g. of crude sodium salt. To a stirred solution of 27.9 g. of this sodium salt in 75 ml. of chloroform, maintained at 42–8°, 18.3 g. of dimethylcarbamoyl chloride was added dropwise. After stirring an additional hour, the mass was filtered and the filtrate washed successively with 30-ml. portions of water, dilute sodium bicarbonate solution, water, dilute hydrochloric acid, and water. The organic layer was dried over magnesium sulfate, concentrated and distilled to yield 21.1 g. of 2,3 - dihydro - 2,2 - dimethyl - 7 - benzofuranyl N,N-dimethylcarbamate boiling at 113–7° (0.20 mm.), $n_D^{25}$ 1.5266. The structure was confirmed by nuclear magnetic resonance studies.

Analysis.—Calc'd for $C_{13}H_{17}NO_3$: N, 5.96. Found: N, 6.10.

Employing the techniques described in Example 1, the compound 2,3-dihydro-2,2-dimethyl-7-benzofuranyl N,N-dimethylcarbamate effected 85% kill of the Mexican bean beetle, 100% kill of the milkweed bug, 100% kill of the pea aphid, and 100% kill of houseflies.

Example 7.—Preparation and pesticidal properties of 2,3-dihydro-2,2 - dimethyl - 7 - benzofuranyl N-methylthionocarbamate The intermediate chlorothioformate ester was prepared according to the procedure of Rivier (Bull. soc. chim. (France), [3], 35, 837 (1906)) from 34.5 g. of thiophosgene and 49.2 g. of 2,3-dihydro-2,2-dimethyl-7-benzofuranol in 150 ml. of chloroform. Seventy-three grams of fine, needle-like yellow crystals melting at 92–3° were obtained after recrystallization from hexane. The structure of 2,3-dihydro-2,2-dimethyl-7-benzofuranyl chlorothioformate was verified by infrared analysis.

This ester was converted to the carbamate ester as follows: A cold solution of 3 g. of anhydrous methylamine in 50 ml. of dry hexane was added to a solution of 10 g. of 2,3-dihydro-2,2-dimethyl-7-benzofuranyl chlorothioformate in 80 ml. of ether to yield 3.7 g. of 2,3-dihydro-2,3-dimethyl-7-benzofuranyl N - methylthionocarbamate, melting at 109–10°. A second crop weighed 3.1 g. and melted at 98–102°. Infrared and nuclear magnetic resonance spectra validated the assigned structure.

*Analysis.*—Calc'd. for $C_{12}H_{15}NO_2S$: C, 60.74; H, 6.37; N, 5.90; S, 13.51. Found: C, 60.66; H, 6.30; N, 6.12; S, 12.87.

Employing the test methods shown in Example 1, the compound 2,3 - dihydro-2,2-dimethyl-7-benzofuranyl N-methylthionocarbamate exhibited 100% kill of the Mexican bean beetle and 100% kill of the milkweed bug.

Example 8.—Preparation and pesticidal properties of 2,3-dihydro - 2,2 - dimethyl-7-benzofuranyl N-ethylcarbamate Following the procedure described in Example 1, 16.4 g. of 2,3-dihydro-2,2-dimethyl-7-benzofuranol was reacted with 7.8 g. of freshly distilled ethyl isocyanate to yield 16.4 g. of 2,3-dihydro-2,2-dimethyl-7-benzofuranyl N-ethylcarbamate, melting at 103–4.5°. An analytical sample was recrystallized from methylcyclohexane to melt at 104–5°.

*Analysis.*—Calc'd for $C_{13}H_{17}NO_3$: N, 5.96. Found: N, 6.24.

Following the procedure described in Example 1, the compound 2,3 - dihydro-2,2-dimethyl-7-benzofuranyl N-ethylcarbamate exhibited 100% kill of the Mexican bean beetle, the milkweed bug and the pea aphid, and 100% kill of houseflies, and good control of the root-knot nematode at 100 p.p.m.

Example 9.—Preparation and pesticidal properties of 2,3-dihydro - 2,2 - dimethyl-7-benzofuranyl N-isopropylcarbamate Following the procedure described in Example 1, 16.4 g. of 2,3-dihydro-2,2-dimethyl-7-benzofuranol was reacted with 9.4 g. of isopropyl isocyanate and the product recrystallized from methylcyclohexane to give 8.5 g. of 2,3-dihydro - 2,2-dimethyl-7-benzofuranyl N-isopropylcarbamate, melting at 103–4°. An analytical sample was recrystallized twice from butyl ether to melt at 107.5–8.5°. The structure of this compound was confirmed by infrared analysis.

*Analysis.*—Calc'd for $C_{14}H_{19}NO_3$: N, 5.62. Found: N, 6.06.

Employing the test methods described in Example 1, the compound 2,3-dihydro-2,2-dimethyl-7-benzofuranyl N-isopropylcarbamate exhibited 55% kill of the Mexican bean beetle and 100% kill of the milkweed bug.

Example 10.—Preparation and pesticidal properties of 4 - chloro - 2,3 - dihydro - 2,2 - dimethyl - 7 - benzofuranyl N-methylcarbamate The intermediate chlorobenzofuranol was prepared as follows: Sulfuryl chloride (67.5 g.) was added dropwise to a solution of 82.1 g. of 2,3-dihydro-2,2-dimethyl-7-benzofuranol in 250 ml. of carbon tetrachloride at room temperature. (Slight warming after addition of the first few drops was necessary to initiate the reaction.) The mixture was stirred at room temperature for two days until evolution of hydrogen chloride ceased. The solution was washed several times with water, dried over magnesium sulfate, and concentrated under vacuum to a purple oil. This mixture of isomers was repeatedly fractionated to yield 19.2 g. of 4-chloro-2,3-dihydro-2,2-dimethyl-7-benzofuranol boiling at 144° (10 mm.) and 20.5 g. of 5-chloro-2,3-dihydro-2,2-dimethyl-7-benzofuranol boiling at 152° (10 mm.). The latter compound solidified to melt at 59–60°. The position of the chlorine substituent in these samples was determined by nuclear magnetic resonance studies.

*Analysis.*—Calc'd for $C_{10}H_{11}ClO_2$: C, 60.46; H, 5.58; Cl, 17.85. Found: (4-chloro- isomer) C, 59.78; H, 5.44; Cl, 17.65; (5-chloro- isomer) C, 60.29; H, 5.56; Cl, 18.08.

The intermediate phenol was reacted with methyl isocyanate as follows: Three drops of triethylamine was added to a mixture of 16.4 g. (0.082 mole) of 4-chloro-2,3-dihydro-2,2-dimethyl-7-benzofuranol and 7.0 g. (0.123 mole) of methyl isocyanate in 100 ml. of anhydrous ether. The mixture was refluxed for 24 hours, and concentrated under vacuum to yield 17.5 g. of white solid melting at 140–2°. The 4-chloro - 2,3 - dihydro-2,2-dimethyl-benzofuranyl N-methylcarbamate was recrystallized from a benzene-hexane mixture to melt at 151.5–2.0°.

*Analysis.*—Calc'd. for $C_{12}H_{14}ClNO_3$: C, 56.36; H, 5.51; N, 5.47; Cl, 13.86. Found: C, 56.91; H, 5.97; N, 5.67; Cl, 13.82.

Following the procedures described in Example 1, the compound 4 - chloro-2,3-dihydro-2,2-dimethyl-7-benzofuranyl N-methylcarbamate exhibited 100% kill of the Mexican bean beetle, the milkweed bug, the pea aphid and the southern armyworm.

Example 11.—Preparation and pesticidal properties of 5 - chloro-2,3 - dihydro-2,2-dimethyl-7-benzofuranyl N-methylcarbamate Following the procedure described in Example 10, 17.3 g. of 5-chloro-2,3-dihydro-2,2-dimethyl-7-benzofuranol was reacted with 7.4 g. (0.13 mole) of methyl isocyanate to yield 19.4 g. of 5-chloro-2,3-dihydro-2,2-dimethyl-7-benzofuranyl N-methylcarbamate melting at 180–2°. Recrystallization from a benzene-hexane mixture raised the melting point to 180.5–1.0°.

*Analysis.*—Calc'd for $C_{12}H_{14}ClNO_3$: N, 5.47; Cl, 13.86. Found: N, 5.47; Cl, 13.76.

Following the procedures described in Example 1, the compound 5 - chloro-2,3-dihydro-2,2-dimethyl-7-benzofuranyl N-methylcarbamate exhibited 100% kill of the Mexican bean bettle and the milkweed bug.

Example 12.—Preparation and pesticidal properties of 2,3-dihydro - 2-isopropenyl-4-benzofuranyl N-methylcarbamate According to the procedure outlined in Example 1, 1.8 g. of 2,3-dihydro-2-isopropenyl-4-benzofuranol (prepared by the method of Takei and Koide, Chem. Ber. 62, 3032 (1929)) was reacted with 0.6 g. of methyl isocyanate to yield 2.4 g. of 2,3-dihydro-2-isopropenyl-4-benzofuranyl N-methylcarbamate melting at 84–5°. On recrystallization from toluene, 1.4 g. of pure product, melting at 85–6°, was obtained.

*Analysis.*—Calc'd for $C_{13}H_{15}NO_3$: N, 6.01. Found: N, 6.28.

Following the test methods described in Example 1, the compound 2,3-dihydro-2-isopropenyl-4-benzofuranyl N-methylcarbamate exhibited 100% kill of the Mexican bean beetle and 100% kill of the milkweed bug.

Example 13.—Preparation and pesticidal properties of 2,3-dihydro-2,2-dimethyl-7-benzofuranyl N-allylcarbamate A solution of 2.6 g. of allylamine and 4.5 g. of triethylamine in 25 ml. of benzene was added dropwise to a solution of 10.0 g. of 2,3-dihydro-2,2-dimethyl-7-benzofuranyl chloroformate in 25 ml. of benzene. The mixture was refluxed for two hours, cooled, filtered and the solid washed with benzene. The combined benzene solutions were extracted with water, dried over magnesium sulfate and concentrated to dryness under vacuum. The residue was recrystallized from a methanol-water mixture to yield 5.7 g. of 2,3-dihydro - 2,2 - dimethyl - 7 - benzofuranyl N-allylcarbamate, melting at 79–82°. A second recrystallization from hexane gave a sample melting at 77.2–8.0°.

*Analysis.*—Calc'd for $C_{14}H_{17}NO_3$: C, 68.00; H, 6.92; N, 5.72. Found: C, 67.76; H, 6.89; N, 5.54.

Employing the test methods described for the compound of Example 1, 2,3-dihydro - 2,2 - dimethyl-7-benzofuranyl N-allylcarbamate exhibited 100% kill of the Mexican bean beetle, the milkweed bug, the pea aphid and the southern armyworm, and 100% kill of houseflies.

Example 14.—Preparation and pesticidal properties of 2,3 - dihydro - 2,2 - dimethyl-7-benzofuranyl N-2-propynylcarbamate Following the procedure outlined in Example 13, 14.0 g. of 2,3-dihydro - 2,2 - dimethyl - 7 - benzofuranyl chloroformate was reacted with 3.4 g. of 2-propynylamine, in the presence of 6.3 g. of triethylamine, to yield 4.9 g. of 2,3-dihydro-2,2-dimethyl-7-benzofuranyl N-2-propynylcarbamate melting at 97–9°, after recrystallization from a methanol-water mixture. A second recrystallization from hexane gave a sample melting at 95.6–7.0°.

*Analysis.*—Calc'd for $C_{14}H_{15}NO_3$: C, 68.55; H, 6.16; N, 5.71. Found: C, 68.35; H, 6.37; N, 5.86.

Employing the test methods set forth in Example 1, the compound 2,3-dihydro - 2,2 - dimethyl - 7 - benzofuranyl N-2-propynylcarbamate exhibited 100% kill of the Mexican bean beetle, the milkweed bug, the pea aphid, and the southern armyworm, and 100% kill of houseflies.

Example 15.—Preparation and pesticidal properties of a mixture of 2,3-dihydro-2,2,4-trimethyl-7-benzofuranyl N-methylcarbamate and 2,3 - dihydro - 2,2,5 - trimethyl-7-benzofuranyl N-methylcarbamate To a stirred solution of 232.3 g. of 4-methylpyrocatechol in 700 ml. of methanol at 55–60°, under nitrogen atmosphere, was added 101.0 g. of sodium methoxide. After refluxing for 1 hour, 169.3 g. of 3-chloro-2-methylpropene was added dropwise, and stirring and heating continued for an additional 20 hours. The solvent was removed under reduced pressure, the residue diluted with 700 ml. of chloroform, filtered and the sodium chloride washed twice with 100 ml. portions of chloroform. The combined filtrate was washed with three 100 ml. portions of water, dried over magnesium sulfate, concentrated and distilled to give 204.0 g. of a dark red oil. Distillation of this oil yielded 83.5 g. of a fraction boiling at 70–4° (0.03 mm.), after removal of the lower boiling forerun. This fraction, $n_D^{26}$ 1.528, was a mixture of 2-[(2 - methylallyl)oxy]-p-cresol and 6-[(2-methylallyl)oxy]-m-cresol. These isomers could not be separated by redistillation or by gas chromatography.

Rearrangement and cyclization was accomplished by heating 152 g. of a mixture of 2-[(2-methylallyl)oxy]-p-cresol and 6-[(2-methylallyl)oxy]-m-cresol in an oil bath. An exothermic reaction occurred at 185°, and the temperature rose to 220°. The mixture was maintained at 205–10° for four hours, cooled and distilled to yield 57.1 g. of a mixture of 2,3-dihydro-2,2,4-trimethyl-7-benzofuranol and 2,3-dihydro-2,2,5-trimethyl-7-benzofuranol, B.P. 128–30° (8 mm.), $n_D^{25}$ 1.535. The presence and structure of these isomers was confirmed by nuclear magnetic resonance studies. The mixture could not be separated by redistillation or by gas chromatography.

*Analysis.*—Calc'd for $C_{11}H_{14}O_2$: C, 74.13; H, 7.92. Found: C, 74.23; H, 7.98.

The mixture of benzofuranols was esterified according to the procedure described in Example 1. Thirty-eight grams of a mixture of 2,3-dihydro-2,2,4-trimethyl-7-benzofuranol and 2,3-dihydro-2,2,5-trimethyl-7-benzofuranol was reacted with 19.4 g. of methyl isocyanate to yield 20.5 g. of a white crystalline solid melting in the range of 110–30°. This mixture of 2,3-dihydro-2,2,4-trimethyl-7-benzofuranyl N-methylcarbamate and 2,3-dihydro-2,2,5-trimethyl-7-benzofuranyl N-methylcarbamate was not separated.

Following the evaluation procedures described in Example 1, this mixture of isomers exhibited 100% kill of the Mexican bean beetle, the milkweed bug, the pea aphid, and the southern armyworm.

Example 16.—Systemic insecticidal activity

These compounds exhibit useful systemic insecticidal activity. This may be illustrated as follows: a 1% solution of 2,3-dihydro-2,2-dimethyl-7-benzofuranyl N-methylcarbamate in acetone was diluted with water to a concentration of 156 p.p.m. of active ingredient. The roots of pinto bean plants at the bifoliate stage of growth were excised, and the plant stems suspended in the solution of the test compound. After three days of immersion of the plant stems, the leaves of the plant were infested with the test insects. Three days after infestation, counts of the percent kill were made. This compound effected 100% kill of the Mexican bean beetle, the pea aphid, the two-spotted mite and the southern armyworm.

In a similar test a 1% solution of 2,3-dihydro-2,2-dimethyl-4-benzofuranyl N-methylcarbamate in acetone, diluted with water to a concentration of 78 p.p.m. of active ingredient, effected 100% kill of the Mexican bean beetle, the pea aphid and the two spotted-mite.

The above results illustrate excellent systemic activity.

Other pesticidal compounds of the class described herein may be prepared by adaptation of the synthetic procedures illustrated above, as well as by other procedures. Generally useful methods for the preparation of these compounds are discussed below. Many of these reaction steps are novel, in addition to the novelty of the overall reaction sequences.

Of particular scientific interest is the preparation of the intermediate 2,3-dihydrobenzofuranols. The carbamates of this invention may be prepared by esterification of the appropriate 2,3-dihydrobenzofuranol, as well as by hydrogenation of the corresponding benzofuranyl carbamates.

The intermediate 2,3-dihydrobenzofuranols may be prepared from the appropriate allyloxyphenols by rearrangement and cyclization, as shown in Example 1. Allyloxyphenos may also be cyclized by Friedel-Crafts techniques, as may halo- or hydroxyalkoxyphenols.

The 2,3 dihydrobenzofuranols may also be prepared by hydrogenation of the corresponding benzofuranol. The preparation of benzofuranols useful for this purpose is described in my United States patent application Serial No. 403,912, filed October 14, 1964.

Allyloxyphenols may be prepared by standard procedures. For example, a dihydroxybenzene may be reacted with an equimolar amount of an allyl halide to produce the monoallyl ether. This reaction normally requires a catalyst. Useful catalysts include potassium carbonate in acetone or in water, potassium carbonate and potassium iodide in acetone, sodium hydroxide, and sodium methoxide in methanol. Alternatively, allyloxyphenols may be prepared from hydroxyphenoxy)acetic acid esters by treatment with a Grignard reagent such as an alkyl magnesium halide, following established procedures for the Grignard reaction. The tertiary alcohol which is formed by this reaction is then dehydrated by standard procedures, to give the allyloxyphenol. These procedures are applicable to starting materials of the general types of those mentioned above. In the preparation of the allyloxyphenol, for example, if a substituted phenol containing a substituent which may be converted to a hydroxyl group is used in place of the dihydroxybenzene, an aryl-substituted allyloxybenzene is obtained. This aryl substituent may then be converted to a hydroxyl group at this point or after subsequent reaction steps. Similarly, if the (hydroxyphenoxy)acetic acid ester discussed above is replaced by an (alkoxyphenoxy)acetic acid ester, the product will be an alkoxy(allyloxy)benzene; the alkoxy ether group may be converted to a free hydroxyl group at a later step in the series of reactions.

As noted above, the allyloxyphenol may be cyclized to the 2,3-dihydrobenzofuranol by means of the Friedel-Crafts reaction, following established procedures for this reaction. Cyclization may also be effected by other methods, such as by use of an aluminate catalyst as described by R. Stroh et al. in Neue Methoden der Praeparativen Org. Chem. II, 231 (1960). These methods are particularly useful in the preparation of 2,3-dihydro-4-benzofuranols.

Allyloxyphenols may also be converted to 2,3-dihydrobenzofuranols by rearrangement and cyclization reactions. These reactions may occur in one apparent step, or an intermediate rearranged but un-cyclized product may be isolated. These reactions occur at elevated temperatures, normally in the range of 150° to 300°. Below about 150° C. the reaction usually is too slow to be practical, and above about 300° degradation of the reactant or product may occur. An acidic environment is preferred for this reaction; however, often the phenolic hydroxyl group is sufficiently acidic that the cyclized 2,3-dihydrobenzofuranol is produced without the use of an acidic catalyst. If an acid catalyst is desired for the cyclization reaction, or to accelerate this reaction, useful catalysts include an amine hydrohalide, magnesium sulfate, or xylenol. Alternatively, the allyldihydroxy benzene may be isolated and subsequently cyclized, in the presence or absence of an added acid catalyst as above noted.

In the preparation of the 2,3-dihydro-4-benzofuranols, preferential rearrangement of the allyl group to the 2-position of the resultant resorcinol may be achieved by use of a ring substituent which increases the electron density of the 2-position. This additional ring substituent may be subsequently removed by known methods. For example, 2,3 - dihydro-2,2-dimethyl-4-benzofuranol was prepared from methyl β-resorcylate, as described in Example 2, or from 7-hydroxy-4-methylcoumarin by formation of the allyl ether of the free hydroxyl group, rearrangement and cyclization, and removal of the protecting group from the other hydroxyl group.

Allyldihydroxybenzenes may also be prepared by reaction of an ester, such as hydroxy-2(3H)-benzofuranone, with an alkyl magnesium halide, following established procedures for the Grignard reaction. The (hydroxyalkyl)dihydroxybenzene formed may be readily dehydrated to the allyldihydroxybenzene.

Other methods of converting dihydroxybenzenes to 2,3-dihydrobenzofuranols may be used. For example, a dihydroxybenzene may be reacted with an allyl halide or alcohol, in the presence of a mild Lewis acid, to give the cyclized compound directly, via a mechanism of ether formation and a Friedel-Crafts alkylation. Alternatively, a dihydroxybenzene may be reacted with an equimolar amount of a 1,2-dihaloalkane to give a (2-haloalkyloxy) phenol. This ether may then be cyclized by Friedel-Crafts alkylation, following established procedures.

The foregoing reactions are, of course, not limited to the specific compounds mentioned. Through the use of the appropriate starting material or reagent, 2,3-dihydrobenzofuranols with the desired substituent or substituents on the aromatic and/or heterocyclic ring may be obtained.

To prepare the final products for pesticidal use herein, the dihydrobenzofuranols may be esterified by standard procedures to give the desired carbamates. Such procedures for the preparation of carbamate esters are described by Wagner and Zook, "Synthetic Organic Chemistry," ch. 23, John Wiley and Sons, New York, 1953. Reagents such as alkyl isocyanates or isothiocyanates, and alkyl- or dialkylcarbamoyl or thiocarbamoyl halides, will produce the carbamate ester directly. Alternatively, the phenolic hydroxyl may be converted to a chloroformate or chlorothioformate ester by reaction with phosgene or thiophosgene, and this ester subsequently reacted with a mono- or dialkylamine to form the desired carbamate.

The novel compounds thus obtained may be formulated with the usual additives and extenders in the preparation of pesticidal compositions. The toxicants of this invention, like most pesticidal agents, are generally not applied full strength. They are generally incorporated in any of the adjuvants and carriers normally employed for facilitating the dispersion of active ingredients, recognizing the accepted fact that the formulation and mode of application of a toxicant may affect the activity of the material. These compounds may be applied, for example, as sprays, dusts, granules, or baits, to the area in which pest control is desired, the choice of application varying of course with the type of pest and the environment. Thus, these compounds may be formulated as granules of large particle size, as powdery dusts, as wettable powders, as emulsifiable concentrates, as solutions, and the like.

Dusts are admixtures of the active ingredients with finely divided solids such as talc, attapulgite clay, kieselguhr, pyrophyllite, chalk, diatomaceous earths, calcium phosphates, calcium and magnesium carbonates, sulfur, lime, flours, and other organic and inorganic solids which act as dispersants and carriers for the toxicant. These finely divided solids have an average particle size of less than about 50 microns. A typical dust formulation useful herein contains 10.0 parts of toxicant, 30.0 parts of bentonite clay and 60.0 parts talc.

The compounds may be made into liquid concentrates by solution or emulsion in suitable liquids, and into solid concentrates by admixture with talc, clays and other known solid carriers used in the pesticide art. The concentrates are compositions containing about 5–50% toxicant and the rest inert material which includes dispersing agents, emulsifying agents, and wetting agents. The concentrates are diluted for practical application, with water or other liquid for aqueous sprays or with additional solid carrier for use as dusts. Typical carriers for solid concentrates (also called wettable powders) include fuller's earth, kaolin clays, silicas, andother highly absorbent, readily wet inorganic diluents. A useful solid concentrate formulation for use herein contains 25.0 parts of toxicant, 72.0 parts of bentonite clay and 1.5 parts each of sodium lignosulfonate and sodium laurylsulfonate as wetting agents.

Useful liquid concentrates include the emulsifiable concentrates, which are homogeneous liquid or paste compositions which are readily dispersed in water or other dispersant, and may consist entirely of the toxicant with a liquid or solid emulsifying agent, or may also contain a liquid carrier, such as xylene, heavy aromatic naphthas, isophorone and other non-volatile organic solvents. For application these concentrates are dispersd in water or other liquid carrier, and normally applied as a spray to the area to be treated.

The concentration of the toxicant in the dilution generally used for control of insect and other pests is normally in the range of about 2% to about 0.001%. Many variations of spraying and dusting compositions in the art may be used, by substituting the compounds of this invention into compositions known or apparent to the art.

Typical wetting, dispersing or emulsifying agents used in pesticidal formulations include, for example, the alkyl and alkylaryl sulfonates and sulfates and their sodium salts, alkylamide sulfonates, including fatty methyl taurides; alkylaryl polyether alcohols; sulfated higher alcohols, polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce. The surface active agent, when used, normally comprises from 1 percent to 15 percent by weight of the pesticidal composition.

Other useful formulations include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the Freons, may also be used. Baits are generally prepared by mixing liquid or solid concentrates with a suitable food, such as a mixture of cornmeal and sugar.

The pesticidal compositions may be formulated and applied with other active ingredients, including other insecticides, fungicides, nematocides, plant growth regulators, fertilizers, etc. In applying the chemicals it is obvious that an effective amount and concentration of toxicant should be employed.

I claim:

1. A member selected from the group consisting of compounds of the formulae:

wherein $R_1$, $R_2$, $R_3$, and $R_4$ are each selected from the group consisting of hydrogen, lower alkyl and lower alkenyl; $R_5$ and $R_6$ are each selected from the group consisting of hydrogen, lower alkyl, lower alkenyl, and lower alkynyl; Y represents a substituent selected from the group consisting of lower aliphatic hydrocarbons, halogen, lower haloalkyl, nitro, amino, lower alkyl substituted amino, lower alkoxycarbonyl, lower acyl, cyano, lower alkylmercapto, lower alkoxy and carbamate, and $n$ is an integer of 1 to 3; and X is selected from the group consisting of oxygen and sulfur.

2. The compound 2,3-dihydro-2,2-dimethyl-7-benzofuranyl N-allylcarbamate.

3. The compound 2,3-dihydro-2,2-dimethyl-7-benzofuranyl N-2-propynylcarbamate.

4. The compound 4-chloro-2,3-dihydro-2,2-dimethyl-7-benzofuranyl N-methylcarbamate.

5. The compound 2,3-dihydro-2,2-dimethyl-4-benzofuranyl N-methylcarbamate.

6. The compound 5-chloro-2,3-dihydro-2,2-dimethyl-7-benzofuranyl N-methylcarbamate.

7. Pesticidal composition comprising an extender and an effective amount of a compound of claim 1.

8. Pesticidal composition comprising an extender and an effective amount of a compound of claim 16.

9. The method of controlling Arthropoda and Nematoda which comprises subjecting them to effective doses of a member selected from the group consisting of compounds of the formulae:

wherein $R_1$, $R_2$, $R_3$, and $R_4$ are each selected from the group consisting of hydrogen, lower alkyl and lower alkenyl; $R_5$ and $R_6$ are each selected from the group consisting of hydrogen, lower alkyl, lower alkenyl, and lower alkynyl; Y represents a substituent selected from the group consisting of lower aliphatic hydrocarbons, halogen, lower haloalkyl, nitro, amino, lower alkyl substituted amino, lower alkoxycarbonyl, lower acyl, cyano, lower alkylmercapto, lower alkoxy and carbamate, and $n$ is an integer of 1 to 3; and X is selected from the group consisting of oxygen and sulfur.

10. 4-chloro-2,3-dihydro-2,2-dimethyl-7-benzofuranol.

11. The compound 2,3-dihydro-2,2,4-trimethyl-7-benzofuranyl N-methylcarbamate.

12. The compound 2,3-dihydro-2,2,5-trimethyl-7-benzofuranyl N-methylcarbamate.

13. The compound 2,3-dihydro-2,2-dimethyl-7-benzofuranyl N-ethylcarbamate.

14. A member selected from the group consisting of compounds of the formulae:

wherein $R_1$, $R_2$, $R_3$, and $R_4$ are each selected from the group consisting of hydrogen, lower alkyl, and lower alkenyl; and $R_5$ and $R_6$ are each selected from the group consisting of hydrogen, lower alkyl, lower alkenyl, and lower alkynyl; with the proviso that when $R_3$ and $R_4$ are each hydrogen and at least two of $R_1$, $R_2$, $R_5$, and $R_6$ are hydrocarbons, the total number of carbon atoms in $R_1$, $R_2$, $R_5$, and $R_6$ is at least four.

15. A dihydro-7-benzofuranyl carbamate of the formula:

wherein $R_1$, $R_2$, $R_3$, and $R_4$ are each selected from the group consisting of hydrogen and methyl; $R_5$ and $R_6$ are each selected from the group consisting of hydrogen and aliphatic hydrocarbons of one to three carbon atoms; with the proviso that when $R_3$ and $R_4$ are each hydrogen and at least two of $R_1$, $R_2$, $R_5$, and $R_6$ are hydrocarbons, the total number of carbon atoms in $R_1$, $R_2$, $R_5$, and $R_6$ is at least four.

16. A dihydro-7-benzofuranyl carbamate of the formula:

wherein $R_1$, $R_2$, $R_3$, and $R_4$ are each selected from the group consisting of hydrogen and methyl; $R_5$ and $R_6$ are each selected from the group consisting of hydrogen and aliphatic hydrocarbons of one to three carbon atoms; and $Y_1$ and $Y_2$ are each selected from the group consisting of hydrogen, halogen, and lower alkyl, with the proviso that at least one of $Y_1$ and $Y_2$ is selected from the group consisting of halogen and lower alkyl.

17. A dihydro-7-benzofuranyl carbamate of the formula:

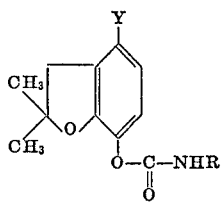

wherein R is selected from the group consisting of hydrogen and aliphatic hydrocarbons of one to three carbon atoms; and Y is selected from the group consisting of chlorine and methyl.

18. The method of controlling Arthropoda and Nematoda which comprises subjecting them to effective doses of a compound of claim 16.

References Cited

UNITED STATES PATENTS 2,362,479  11/1944  Gibbs _____ 260—346.2

OTHER REFERENCES

Noller, Chemistry of Organic Compounds, second edition (1957), page 317.

ALEX MAZEL, Primary Examiner

BERNARD I. DENTZ, Assistant Examiner

U.S. Cl. X.R.

260—346.2